March 29, 1966  W. S. KREISMAN  3,243,649
HOT FILAMENT IONIZATION GAUGE
Filed Aug. 14, 1962  3 Sheets-Sheet 1

INVENTOR
Wallace S. Kreisman

BY
ATTORNEYS

March 29, 1966  W. S. KREISMAN  3,243,649
HOT FILAMENT IONIZATION GAUGE
Filed Aug. 14, 1962  3 Sheets-Sheet 2

INVENTOR
Wallace S. Kreisman
BY *LeBlanc & Shur*
ATTORNEYS

United States Patent Office 3,243,649
Patented Mar. 29, 1966

3,243,649
HOT FILAMENT IONIZATION GAUGE
Wallace S. Kreisman, Malden, Mass., assignor to GCA Corporation, Bedford, Mass., a corporation of Delaware
Filed Aug. 14, 1962, Ser. No. 216,782
7 Claims. (Cl. 315—111)

This invention relates to a vacuum gauge and more particularly to a vacuum gauge of the hot filament ionization type which has a longer useful life and will accurately cover a wider pressure range than heretofore known vacuum gauges of the hot filament type. The invention described herein was made in the performance of work under a NASA contract and is subject to the provisions of Section 305 of the National Aeronautics and Space Act of 1958, Public Law 85–568 (72 stat. 435; 42 U.S.C. 2457).

Of the many types of hot filament ionization gauges known and used today, the so-called Bayard-Alpert type, which is described in the United States patent to Bayard, No. 2,605,431, is probably the most useful. By using a gauge of the Bayard-Alpert type, it is possible to measure pressures as low as $1 \times 10^{-10}$ mm. of mercury. However, pressure readings below this level are difficult or impossible to obtain because of the ejection of photoelectrons from the ion collector. The ejection of such photoelectrons is caused by the impingement of X-rays that are created when electrons strike the electron collector (grid of the gauge). The upper limit of pressure that can be measured with the Bayard-Alpert gauge is about $10^{-2}$ mm. of mercury and this limit can be reached only if the electron emission of the filament is reduced. Thus, the typical Bayard-Alpert gauge is limited to a pressure range of approximately $10^{-10}$ to $10^{-2}$ mm. of mercury.

Besides having this limited range, the Bayard-Alpert gauge also suffers from several other undesirable characteristics. Among the most noticeable of these shortcomings is the poor mechanical makeup and short life span of the gauge. As an example, the gauge is generally constructed with a glass envelope which: (1) has limited strength; (2) can be subjected to only limited bake-out temperature; (3) is subject to helium permeation; (4) has low body resistivity at higher temperatures; (5) is subject to electrical charge-up; and (6) has no electrical shielding properties. Moreover, the long lead-in wires which are conventionally used and which pass through the glass envelope in a vacuum tight fashion to support the various electrodes of the gauge makes it unsuitable for use where any vibration might be encountered. This is due to the fact that the lead-in support wires, which are supported by the glass envelope, are easily set into vibration which often becomes so severe as to (1) break the airtight seals surrounding the wire and/or (2) to disalign the electrodes of the gauge.

This support problem is conventionally combatted in Bayard-Alpert gauges through the use of relatively large collector wires which are normally 10 to 20 mils in diameter. These are conventionally formed of metals selected (among other things) for their rigidity characteristics, tungsten being the most common choice. The use of these relatively large collector wires materially contributes to the limited low pressure range and cost of the gauge as will be more fully explained hereinafter. Making positive connection to the long lead-in wires is also a difficult job since the wires may accidentally be bent sufficiently to break the vacuum type seal of the envelope.

The conventional Bayard-Alpert gauge is subject to other disadvantages in that it is hard to construct, has a limited life expectancy and often requires special external circuitry therefore making its use expensive. For example, the metal grid of conventional hot filament ionization gauges is either a spiral wound wire than can be outgassed with direct current, or a spinal-type grid structure that must be outgassed by electron bombardment. The spiral grids are susceptible to vibration and sagging while the spinal-type grids require a high voltage, high current power for electron bombardment outgassing.

According to the present invention it has now been found that it is possible to provide an improved hot filament ionization type vacuum gauge capable of overcoming or materially limiting the previously described disadvantages in gauges of the same general type which are now available. The improved gauge is constructed completely of metal and high density alumina ceramic in a manner which assures a rugged mechanical design and will also permit a higher bake-out temperature to be used than heretofore possible. This type of metal housing requires no external shielding and prevents the permeation of gasses through the gauge as often occurs where glass is used. A split ring assembly is used to support a unique grid element formed of a cylinder containing a multiplicity of saw cuts disposed 90° apart. Each end of the grid element is sealed and contains a small permanent magnet for extending the range of the gauge by reducing the undesired photoelectron effect. The split ring assembly is, in turn, positioned within the gauge by insulative spheres. An ion collector wire, which, according to one feature of the invention, is supported at both ends for additional strength and stability, is passed through the center of the grid element. Electrons are produced within the gauge by a filament wire supported under tension on the removable cover of the gauge. In its completely assembled condition the gauge electrodes are connected through ceramic to metal feed-throughs to an electrical circuit that allows the potentials applied to the various electrodes to be varied or reversed thereby extending the dynamic range of the gauge.

Accordingly, the primary object of this invention is to provide an accurate, dependable, and rugged vacuum gauge.

Another object of this invention is to provide a hot filament ionization gauge that will measure gas pressures over a wider range than can be measured with conventional hot filament gauges.

Yet another object of this invention is to provide a hot filament ionization gauge that is so constructed that it will give relatively trouble-free operation in extreme environments of temperature, pressure, vibration and shock.

Still another object of this invention is to provide a hot filament ionization gauge that can be easily opened and disassembled for cleaning or repairing.

A further object of this invention is to provide a hot filament ionization gauge which has a filament arrangement that may be removed and replaced thereby giving an extended useful life to the gauge.

A still further object of this invention is to provide a hot filament ionization gauge in which the ion collector electrode is a wire of very small diameter.

A still further object of this invention is to provide a hot filament ionization gauge in which the ion collector electrode is made of a high work function metal and is supported at both ends to provide ample strength and stability.

A still further object of this invention is to provide an ionization gauge using internal magnets for reducing the undesirable photoelectron effect.

Still another object of this invention is to provide an ionization gauge in which the electron grid is rigid yet easily outgassed.

Still another object of this invention is to provide a hot filament ionization gauge having a metal housing which is used as one electrode of the gauge.

Another feature of this invention is to provide a hot filament ionization gauge having electrodes that are supported by insulating spheres which are outside of and shielded from the outgassing action of the electron grid.

Yet another object of this invention is to provide a gauge which has the above-recited characteristics yet is inexpensive to construct.

These and further objects and advantages of the invention will become more apparent upon reference to the following description and claims and the appended drawings wherein:

The same reference numerals denote the same parts throughout the several views of the drawings.

Figure 1:
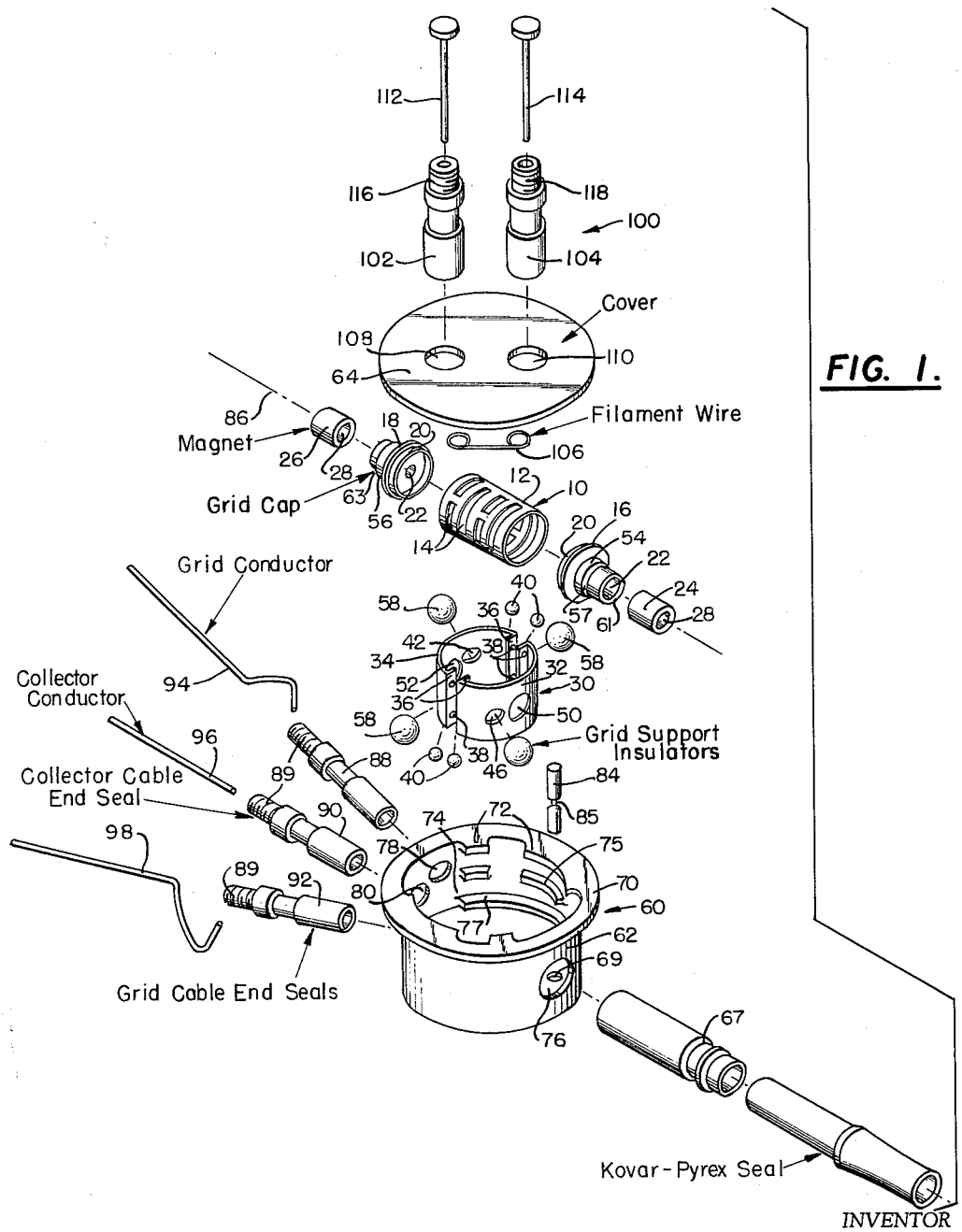
FIGURE 1 is an exploded view of the improved hot filament ionization gauge of this invention.

In FIGURE 1, a grid assembly is indicated generally at 10 and consists primarily of a grid element 12 fashioned from a thin-walled metal cylinder that contains multiple saw cuts 14 which are disposed 90° apart. These saw cuts transform the cylinder into an open grid structure in which each quadrant consists of a zig-zag ribbon extending from one end of the cylinder to the other. This type of zig-zag grid structure can be thought of as containing four current paths in parallel which gives a very strong mechanical configuration that can readily be outgassed by passing alternating current directly through it from one end to the other as will be more fully explained hereinafter in relation to FIGURE 4. The grid is preferably made of a refractory material such as molybdenum, but it is possible to also use a nickel, chromium, or iron alloy if such should be found desirable.

The ends of the cylindrical grid 12 are sealed with grid caps 16 and 18, thereby not only preventing ions from escaping from the grid, but also adding strength to the grid assembly and providing an electrical connection through which the grid may be connected to an external circuit. Each cap 16 and 18 is provided with a lip or machined down surface 20 which is press fitted within the ends of the grid 12. The other surface of the grid cap carries an outwardly extending reduced diameter portion 54–56 which carries at its end 57–59 a still further reduced diameter section 61–63. The openings 22–23 in these last mentioned sections receive press fitted cylindrical premanent magnets 24–26, respectively, which extend in toward the center of the grid assembly. These permanent magnets are used to substantially reduce or eliminate any photoelectron effect that may be produced within the cylindrical grid. In order that a collector wire 86 may be passed through the center of the grid assembly, an aperture or hole 28 is provided in each of the permanent magnets 24–26.

The grid assembly, which is indicated generally at 10 in FIGURE 1, is mounted in a split ring support assembly, indicated generally at 30, which is made up of two semi-circular sections 32 and 34. These sections are provided with diametrically turned in edges 36 which have a plurality of opposed apertures 38 formed therein. Seated against the rims or edges of these apertures is a plurality of small spherical insulators 40 which are preferably made of high density alumina. These spherical shaped insulators serve to keep the sections 32 and 34 in place and electrically insulated from one another as is more clearly seen in FIGURES 2 and 3. The curved sections of the split ring support assembly are also provided with a plurality of apertures or holes 42–52. The apertures 50 and 52 receive the reduced diameter sections 54 and 56 of the end caps 16 and 18, respectively, which are positioned in the proper aperture just prior to the semi-cylindrical sections 32 and 34 being placed together to form the complete split ring assembly.

Thus, with the grid assembly 10 located within and supported by the split ring assembly 30, the split ring and grid assemblies are now ready to be mounted within the housing assembly, indicated generally at 60.

The housing assembly 60 consists primarily of three metal components which are the envelope 62, the cover 64, and the tubulation 66. These components may be formed of stainless steel, nickel, Kovar, or any one of the refractory metals. The envelope 62, which forms the major portion of the housing assembly, is formed in a generally cylindrical cup shape. The bottom portion 68 of the envelope has a blind opening 69 bored axially in its upper surface near one edge (FIGURE 2) while the other end or top of the envelope is open and is provided with an outwardly extending flange 70 and a plurality of inwardly extending clamping lugs 72. A circumferential channel 74 is formed around the inside of the envelope sidewalls by a pair of ridges 75 and 77. The ridge 77 is substantially continuous except at the side openings in the envelope while the ridge 75 is discontinuous to facilitate mounting. A plurality of apertures or holes 76–82 are provided through the envelope wall.

The grid and support assemblies 10 and 30 respectively are positioned within the envelope 62 in substantially the following manner:

A spherical insulator 58, which may be formed of synthetic sapphire or other material having high insulating properties, is placed in each aperture 42–48 in the split ring assembly so that it rests on the outer rim or edge of the hole. The complete grid and support assemblies are now lowered into the envelope 62 and the four spherical insulators are forced over the ridge 75 into the circumferential channel 74 which extends around the inside of the envelope wall. The final position of the support assembly and its four support insulators is more clearly shown in FIGURE 3. It will be appreciated that the split rings are now under radial compression and are firmly locked in place.

An insulating collector support post 84, which is preferably made of either high-density alumina or synthetic sapphire is provided for supporting one end of a collector wire 86. The lower end of the support post is inserted into the bore 69 in the bottom of the envelope, as more clearly seen in FIGURE 2, while the upper end of the post is positioned for mating connection with the cover 64 as will be more fully explained hereinafter. As can be seen in FIGURE 1, the post 84 is provided with a narrow groove 85 at its center for the purpose of positioning one end of the collector wire 86.

Figure 3:
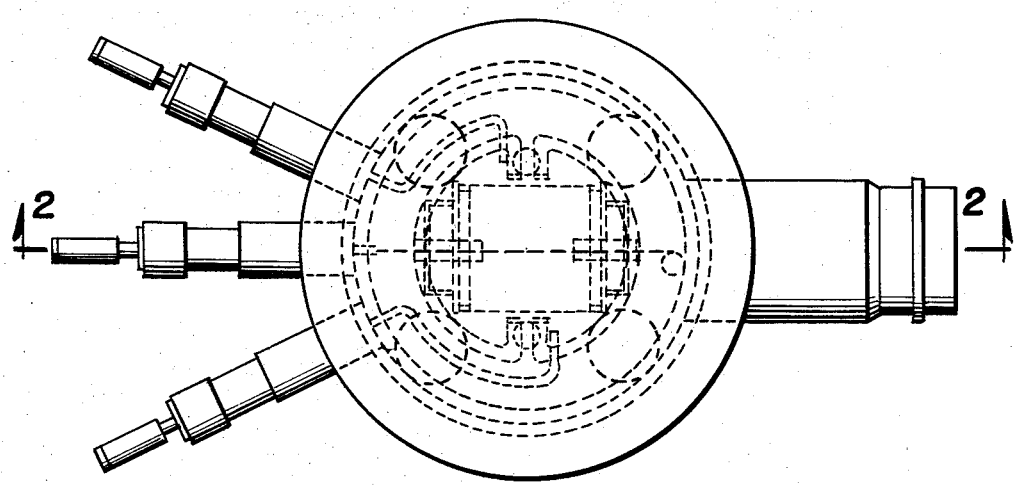
FIGURE 3 is a top view of the ionization gauge of FIGURE 2.
Figure 2:
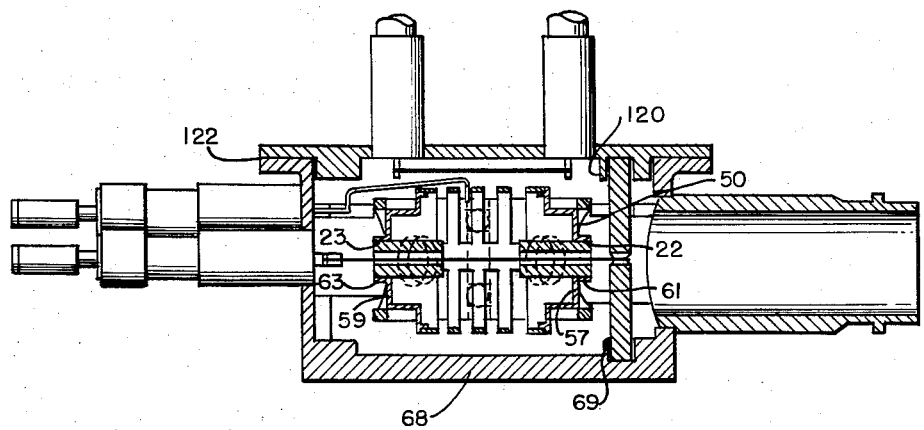
FIGURE 2 is a cross sectional view of the new ionization gauge taken along lines 2—2 of FIGURE 3.

Ceramic to metal cable end seals 88–92 are now added to the gauge for making a vacuum tight electrical connection through the envelope to the electron grid and support assemblies and the ion collector wire. The ends of the seals 88–92 are inserted within and welded to the apertures 78–82 in the envelope 62, as seen in FIGURES 2 and 3. A plurality of electrical connectors 94–98, which may be made of pure nickel, are now inserted through the ceramic to metal end seals and their lefthand ends welded or clamped in an airtight manner to the threaded studs 89 of their respective cable end seals.

Electrical connections to the grid assembly 10 for purposes of normal gauge operation and outgassing are made through the two semi-cylindrical metal sections 32 and 34 of the split ring assembly 30. With the grid and support assemblies in their proper position, the two grid connectors 94 and 98, which have their inner ends generally arcuately bent, as shown in FIGURES 1 and 3, are welded to the split ring sections 32 and 34, respectively.

Figure 4:
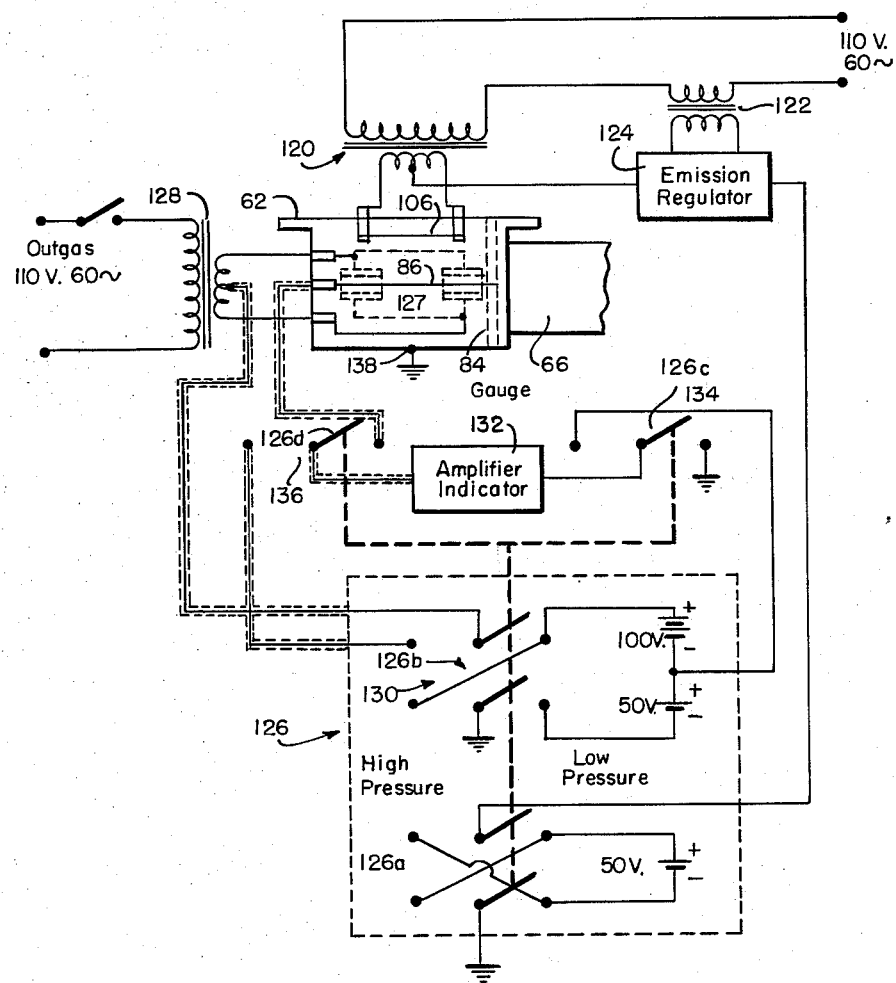
FIGURE 4 is a control circuit arrangement for the improved hot filament ionization gauge of this invention.

Mounting and electrical connection to the ion collector wire 86 is made in the following manner. The wire, which according to the invention, may be and preferably is made of platinum or any high work function metal, has one end wrapped and then spot welded around the groove 85 formed in the insulating collector support post 84. The other end of the collector wire extends through the aperture 28 of the righthand magnet, through the center of the grid assembly 12, and then through the aperture 28 of the lefthand magnet. The free end of the wire is then wrapped about, and spot welded to, the righthand end of the ion collector conductor 96 which is projecting into the envelope as shown in FIGURES 2 and 4. It will be appreciated that this construction provides support for both ends of the ion collector wire and thereby permits the use of wire of a considerably smaller diameter than could be satisfactorily heretofore used.

With the grid and collector elements held securely in their proper position and electrically connected to their respective conductors, the gauge is now ready for the cover and filament assembly, indicated generally at 100, which is constructed as follows. A pair of ceramic-to-metal end seals 102 and 104 are respectively inserted into a pair of apertures 108 and 110, in the cover 64 where they are then welded to form a vacuum tight seal. Electrical filament conductors 112 and 114, which are preferably made of tungsten or molybdenum wire that is clad in nickel, are now inserted through the seals and are welded or clamped to the top or threaded ends 116 and 118 of the seals. The threaded ends 116 and 118 of the seals permit a quick and easy connection to be made to the gauge without requiring any welding or brazing as has been the general practice with prior gauges. A filament wire 106 is now wrapped around and spot-welded to the ends of the filament conductors 112 and 114. In order to insure better operation of the gauge, the filament wire is preferably wrapped so that it is placed under a slight tension between the conductors.

In assembling the entire gauge, the cover is properly aligned by mating the lugs 72 on the top of the envelope with mating portions of the cover (not shown) so that the upper end of the collector support post 84 is positioned in and supported by a bore 120 in the cover (FIGURE 2). The cover is now heliarc welded to the envelop flange 70 at the outer edge 122 (FIGURE 2) to make the gauge vacuum tight. If necessary the gauge may be taken apart for cleaning or repairing an element such as, for example, the filament 106 by simply machining off the small portion of the edge 122 that is welded. As can be seen in FIGURE 2, the flange 70 and cover 64 are of such size as to allow many such disassembling operations to be performed.

A tubulation 66 is provided for connecting the complete gauge to a system to be tested. The left hand end of the tubulation is inserted into the aperture 76 formed in the metal envelope 62 and welded thereto to form an air tight seal. The right hand end 67 of the tubulation has a ridged surface formed or machined thereon so that an airtight fit can readily be made between the tubulation and any other connection or tubing that may be used.

FIGURE 4 shows a preferred circuit arrangement for use with the improved hot filament ionization gauge shown in FIGURES 1–3. In this circuit, the filament 106 of the gauge is connected to a filament transformer 120 which is in turn connected to a source of alternating current. The electron current flow from the filament, although small, can be measured and regulated in a conventional fashion, such as by using a conventional feedback regulator circuit represented by the transformer 122 and emission regulator 124.

The bias and various connections to the hot filament ionization gauge are made through a ganged switching arrangement indicated generally at 126. With the switch in its right hand position, the gauge is connected to measure high pressures, while moving the ganged switch to the left places the gauge in condition for measuring low pressures. The operations of the various switches 126a–126d making up the switching arrangement 126 is substantially as follows:

The bias of the filament in respect to ground potential, which is indicated at the point 138 connected to the metal envelope 62, is selected by operating the switch 126a. With the switch thrown to the right, a bias of approximately 30 volts is applied to the filament while throwing the switch to the left will place approximately a −50 volt bias on the filament.

The grid support assembly is connected to a low voltage, high current filament type transformer 128 which is used for outgassing the gauge. The center tap winding of the secondary side of this transformer is connected to a double-pole double throw switch 126b which serves to either bias or connect the grid to an indicator circuit 132 depending upon the pressure range being measured. The grid is normally biased to around 150 volts when switch 126b is thrown to the right and to around −100 volts when the switch is in the left hand position. This −100 volt bias is applied to the grid 12 through the indicator circuit 132 and switch 126c as seen in FIGURE 4.

The fine collector wire 86 is connected through a switch 126d to the amplifier indicator circuit 132, which is grounded when the switch 126c is in the right hand position. Movement of the switch 126d to the left position disconnects the collector wire from any circuit.

The overall principles and operation of the gauge and associated circuitry may be explained in the following manner:

All hot filament ionization type pressure gauges work on the same general principle, that is, positive ions are created by electron bombardment of the neutral gas molecules. The electron current used in these hot filament ionization type pressure gauges to produce the electrons is usually kept as near constant as possible by using feedback circuitry and is measured by an indicator circuit. Positive ions are collected at the ion collector electrode and measured with the current so produced being proportional to the gas pressure within the gauge up to certain limits.

One of the basic problems of hot filament ionization type pressure gauges is how to extend their dynamic range and increase their sensitivity. It is known that one way of increasing the overall sensitivity of the gauge, which is usually given in terms of the positive ion current in microamperes per micron of pressure per milliampere of electron emission current, is by increasing the length of the electron trajectory. One method by which these electron trajectories may be increased is by using a magnetic field axial to the gauge. Such a field will cause the electrons to move in curved paths, thereby lengthening their trajectories.

According to this invention, a second use of a magnetic field (as produced by the permanent magnets 24–26) is also provided in the gauge for extending the low pressure limit of the gauge by substantially or completely preventing the emission of secondary electrons. The operation of this permanent magnet is based upon the known fact that if a uniform magnetic field of sufficient magnitude is established parallel to an electron emission surface, electrons that leave the surface (due to the absorption of X-ray photons, for example) will be deflected into a curvilinear orbit and returned to the surface. For a cylindrical configuration of electrodes, the arrangement consisting of a central, axial filament surrounded by a coaxial, positively charged anode with the entire device being submerged in a uniform, axial magnetic field, is known as a simple magnetron. If the magnetic field is sufficiently strong in relationship to the radial electric field, electrons that leave the filament and are accelerated toward the anode by the electric field are deflected by the magnetic field and returned to the filament. The magnetron is said to be "cut off" under these conditions.

Thus, it is seen that a hot filament ionization gauge having a central, axial ion collector at zero or ground potential with respect to a surrounding, coaxial, positively charged grid structure will have the electrode geometry of a simple magnetron. If an axial magnetic field is provided by a magnet such as the permanent magnets 24–26, then it becomes possible to "cut off" all electrons that may leave the ion collector under the influence of X-ray radiation. By doing this, the low pressure X-ray limit of the conventional Bayard-Alpert type gauge is removed.

The upper or high pressure range of the gauge of this invention is improved by a combination of gauge construction and the electrical biasing circuitry associated with the gauge.

In the Bayard-Alpert type gauge, the filament is located between the electron grid structure and the conventional glass envelope of the gauge. It was found that if the gauge is constructed with a metal envelope or shield placed around the filament, then it becomes possible to change the electrode potentials in such a way as to insure very short electron trajectories, which is required for the measurement of higher pressures in the order of 1 mm. of mercury. The changing of the electrode potentials applied to the hot filament ionization gauge of this invention is accomplished by using the circuit shown in FIGURE 4. The operation of this circuit in relation to the gauge may be explained in substantially the following manner.

In normal, low pressure operation, the switches 126a–126d of FIGURE 4 are closed to the right as shown. With the switches in this position, the filament 106 is kept at a potential of about +30 volts, the electron grid 112 is at a potential of about +150 to +200 volts, and the ion collector 86 is connected through the amplifier indicator 132 to ground potential. Thus, it may be seen that the gauge is operating as a conventional hot filament ionization gauge.

For so-called high pressure operation, the switches 126a–126d of FIGURE 4 are placed in the left hand position. With the switches in this position, the filament 106 will be placed at a potential of about −50 volts, the electron grid 12 will be placed at a potential of about −100 volts, the ion collector 86 will be at a potential of about −70 volts, and the metal envelope will remain at zero or ground potential. Thus, in high pressure operation, electrons that are emitted by the filament will be accelerated toward the metal envelope or cover plate by the 50 volt potential difference between these elements. After the electrons obtain sufficient energy to create positive ions, some positive ions will be formed in a limited region between the filament and envelope. These positive ions find themselves in an electrical field that is directed radially inward and they will move toward the electron grid and the ion collector at the center of the gauge. However, since the ion collector is at a positive potential with respect to the electron grid, the positive ions will oscillate within the potential well that is centered about the electron grid until they are either collected by the grid or neutralized. The positive ion current flow produced in the grid structure will be a measure of the gas pressure within the gauge. Thus, the close spacing between the electron grid, filament, and metal envelope insure an extended region of linearity between ion current and gas pressure which has not been obtainable in heretofore known gauges.

Outgassing of the gauge is obtained by connecting the transformer 128 to a source of alternating current which causes a high current to flow through the grid and thereby outgas the gauge.

It will be apparent from the foregoing that the gauge of this invention possesses many novel features that make it materially superior to any gauge that is now presently known or available. The novel metal envelope and electrode arrangement not only make the gauge mechanically stronger, but also allows the gauge to be disassembled and the electrodes removed for repair or replacement thereby giving the gauge a longer effective life. The envelope also provides shielding for the gauge and will permit a higher bake-out temperature to be used than was possible in prior known like gauges.

The use of a small diameter ion collector wire, internal permanent magnets, and the metal envelope as the electron collector at high pressures substantially extends the range covered by the gauge. Also, by placing the metal envelope at ground potential, it is impossible to have any electrical surface leakage current from the high voltage grid to the ion collector as has occurred in prior known gauges. The absence of any glass also prevents an electrical charge from accumulating and thereby distorting the electrical field within the gauge.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hot filament ionization gauge comprising a metal envelope, said metal envelope having removable cover means whereby said envelope may be opened, a cylindrical electron grid structure located within said envelope and having its ends closed so that positive ions produced within said grid cannot escape at said ends, magnet means located at each end of said grid for reducing photoelectron emission, ion collector means located within said cylindrical electron grid, and filament means located within said envelope.

2. A hot filament ionization gauge according to claim 1 wherein said removable cover means and said envelope include matching flanges welded together, said removable cover being removed by machining off said welding.

3. A hot filament ionization gauge according to claim 1 wherein said cylindrical electron grid structure and said envelope have receptacles formed therein and a plurality of insulating spheres which are substantially completely outside of and shielded from said electron grid structure, disposed in said receptacles to support said electron grid structure.

4. A hot filament ionization gauge comprising a metal envelope, said metal envelope having a cylindrical shape with an open and closed end, said open end having a flanged out lip, a cover for fitting over said open end of said metal envelope, a first and second electrical feed through connectors secured to said cover, removable filament means electrically connected to and carried by said first and second electrical feed through connectors, electron grid means located within said envelope, said grid means being formed of a slotted cylinder, a permanent magnet located in either end of said grid means, ion collector means located within said grid means, said ion collector means consisting of a fine metal wire passing through an aperture in said permanent magnets, said permanent magnets being so located as to produce an axial magnetic field surrounding said ion collector wire, split ring structure means surrounding said grid means, said split ring structure means consisting of two semi-circular sections separated by spherical insulators, each of said two semi-circular sections being adapted to receive and support one end of said grid means, channel means located on the internal wall of said metal envelope, spherical insulators positioned in said channel means for holding said split ring structure means in place, third and fourth electrical feed through connectors secured to said envelope, means for securing said third and fourth electrical feed through connectors to said split ring structure means, fifth electrical feed through means secured to said envelope, means for securing said fifth feed through to one end of said ion collector wire, and insulative support means secured to the other end of said ion collector wire.

5. A hot filament ionization gauge according to claim 4 wherein an electrical circuit is connected to said gauge for applying a bias to said metal envelope and said feed through connectors so that said metal envelope will collect any electrons present within said gauge and said grid will collect any ions present within said gauge.

6. A hot filament ionization gauge according to claim 5 wherein said electrical circuit is connected to said gauge for applying a bias to said metal envelope and said feed through connectors so that said ion collector will collect any ions present within said gauge.

7. A hot filament ionization gauge comprising housing means, means disposed within said housing means for causing said filament to emit electrons to produce ions, ion collector means disposed within said housing means, and a substantially cylindrical grid having closed ends to prevent the escape of positive ions through said ends, said grid being of zig-zag configuration and also being disposed within said housing means, said zig-zag configuration forming generally parallel paths for current flow to facilitate outgassing of said grid.

References Cited by the Examiner

UNITED STATES PATENTS

| | | | |
|---|---|---|---|
| 2,497,496 | 2/1950 | Gooskens et al. | 313—333 |
| 2,516,704 | 7/1950 | Kohl | 313—7 |
| 2,795,716 | 6/1957 | Roberts | 313—7 |
| 2,870,358 | 1/1959 | Moesta | 313—7 |
| 2,937,295 | 5/1960 | Redhead | 313—7 |
| 3,051,868 | 8/1962 | Redhead | 324—33 X |

FOREIGN PATENTS

| | | |
|---|---|---|
| 1,187,787 | 9/1959 | France. |
| 754,515 | 8/1956 | Great Britain. |

GEORGE N. WESTBY, *Primary Examiner.*

ROBERT SEGAL, *Examiner.*